May 12, 1959   D. J. CUPEDO   2,885,906
STOP VALVE COMPRISING A SCREW SPINDLE
Filed July 29, 1957   4 Sheets-Sheet 1
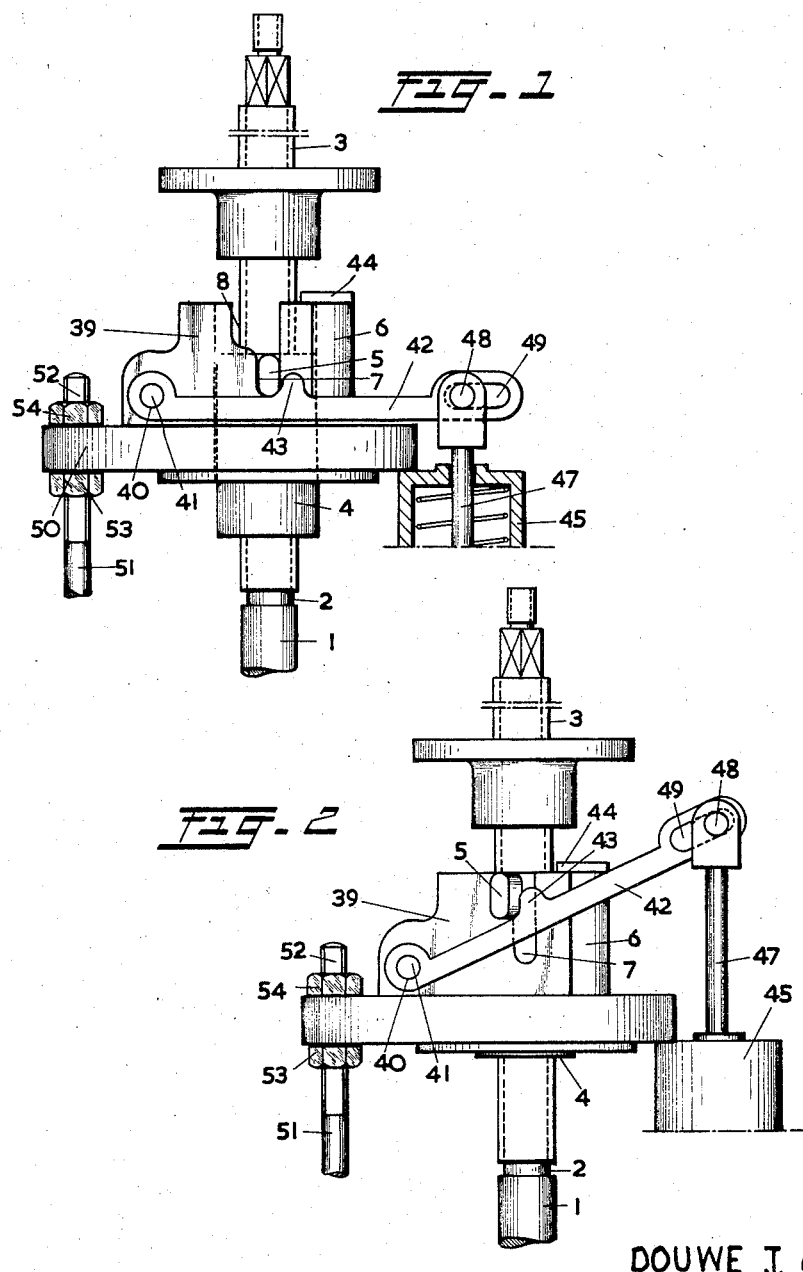
DOUWE J. CUPEDO
*INVENTOR.*
BY Wenderoth, Lind & Ponack
Attys

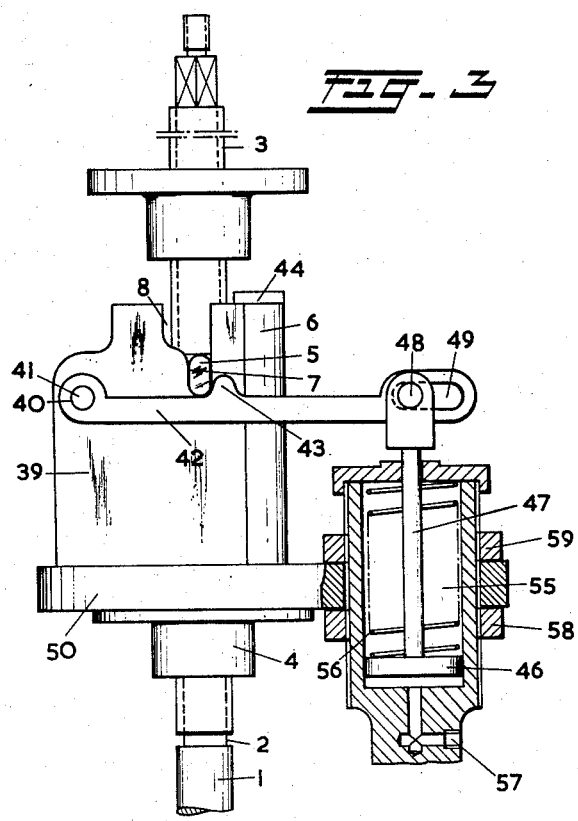

May 12, 1959 D. J. CUPEDO 2,885,906
STOP VALVE COMPRISING A SCREW SPINDLE
Filed July 29, 1957 4 Sheets-Sheet 3
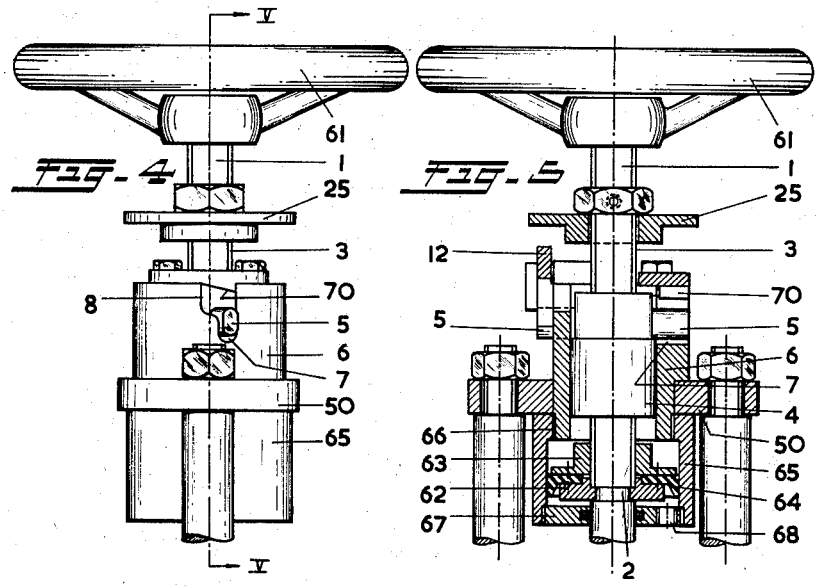
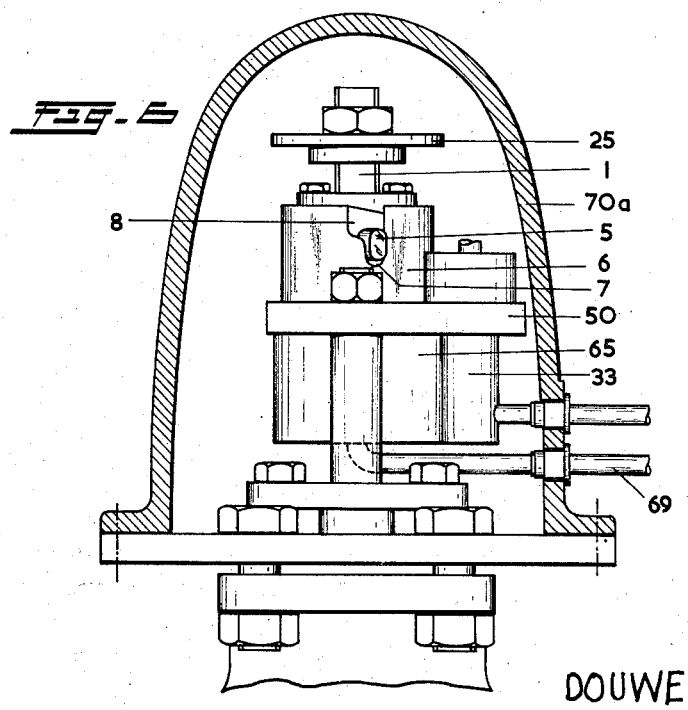
DOUWE J. CUPEDO
*INVENTOR.*
BY Wenderoth, Lind + Ponack
Attys

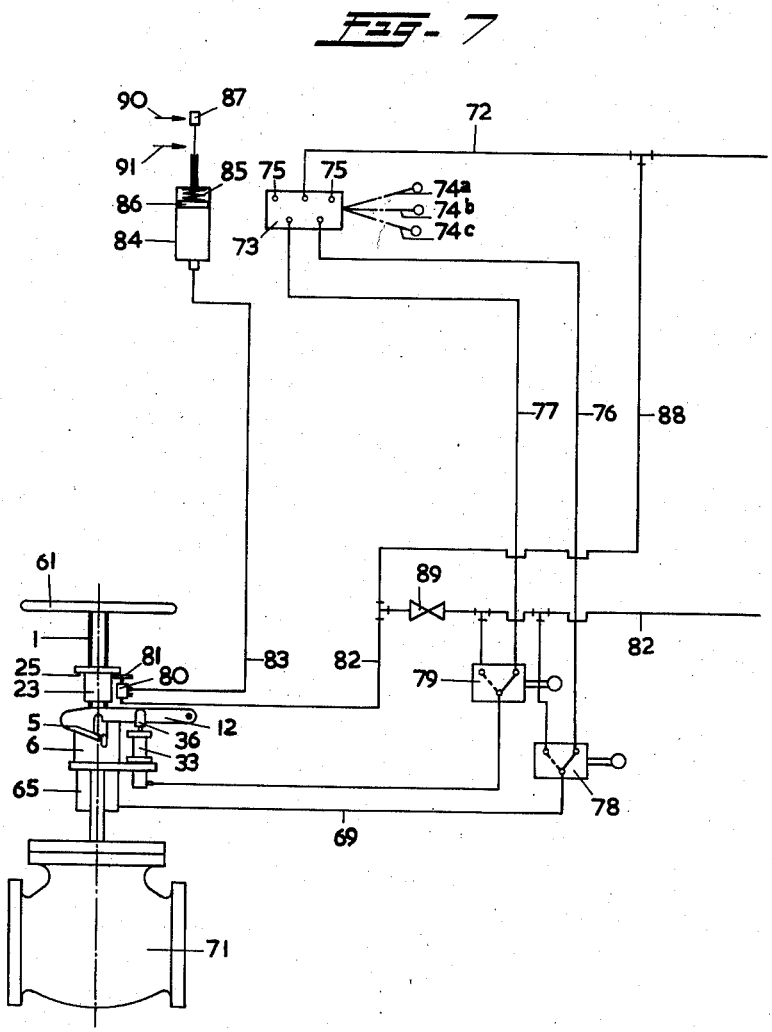

United States Patent Office 2,885,906
Patented May 12, 1959

2,885,906
STOP VALVE COMPRISING A SCREW SPINDLE

Douwe Janse Cupedo, Leidschendam, Netherlands

Application July 29, 1957, Serial No. 674,896

Claims priority, application Netherlands August 2, 1956

9 Claims. (Cl. 74—625)

This invention relates to a stop valve comprising a threaded spindle, a valve member connected with said spindle and an axially guided nut cooperating with said spindle and adapted to be locked, which nut is provided with at least one radial stud guided in a slot axially extending in a member surrounding said nut, which slot at the end remote from the valve has a tangential enlargement on one side thereof.

A stop valve of this type is described in my copending patent application Serial No. 640,848 filed Feb. 18, 1957. Said valve comprises means enabling the valve to be remotely actuated for closing it, which closing is effected by moving the nut out of the locked position in which the stud is enlarged in the enlargement in the slot, whereupon a spring acting on the stop valve closes same. However, opening the valve and returning the nut to its locked position can only be effected by operating a handwheel mounted on the threaded spindle.

The need has made itself felt to make the valve remotely controllable also in respect of these latter two manipulations, i.e. opening the valve and returning the nut to the locking position again, the remote controllability of which is of especial importance, for example, in the case of a bilge valve on board ships.

To achieve this end according to the invention the stop valve is so constructed that pneumatic, hydraulic or electromagnetic means for acting on the nut are provided said means lifting the closed valve in opposition to a spring.

According to a feature of the invention the stop valve may be so constructed that the nut and stud are adapted to be engaged by a remotely controllable level to lift the nut and the valve against a spring from the closed to the open position.

Now in order to make it unnecessary to keep the lever itself in the lifted position for the entire period during which the valve is in the open position, the valve may be so constructed that the lever is mounted on a stationary shaft perpendicular to the threaded spindle and is provided with a projection or an inclined face that will move the stud on the nut into the locked position in the enlargement of the slot.

Alternatively the stop valve according to the invention may comprise a central cylinder comprising a piston axially fixed on the threaded spindle, the arrangement being such that by lifting the piston pneumatically or hydraulically the stud on the nut adjacent the end of the lifting stroke is brought into engagement with a stationary projection arranged at the enlarged end of the slot, which projection during the latter portion of the lifting stroke forces the stud into the tangential enlargement.

The valve may be so constructed that the central cylinder is disposed between the cover of the stop valve casing and the member guiding the nut.

The invention will now be further described with reference to the accompanying drawing showing a plurality of embodiments.

Fig. 1 is an elevation view, partly in section, of a portion of the stop valve according to a first embodiment, the valve being closed and the nut being unlocked;

Fig. 2 is a corresponding showing, the valve, however, being in the open position and the nut in its locked position;

Fig. 3 is a showing corresponding to Fig. 1, but showing another embodiment;

Fig. 4 is an elevation of the stop valve of a still further embodiment of the invention;

Fig. 5 is a section on line V—V in Fig. 4;

Fig. 6 is an elevation view, partly in section, of a still further embodiment according to the invention;

Fig. 7 is a diagram of conduits for remote control of the stop valve according to the invention.

In all the figures the same reference numerals are used for the same parts.

At the lower end of the threaded spindle 1, which forms the stem of the valve the valve member of the stop valve is mounted so as to be rotatable but fixed against movement in the axial direction. The lower end of the spindle and the valve member have not been shown; the groove 2 forming the lower boundary of the screw thread 3 is indicative of the position of the valve.

On the spindle 1 is threaded a nut 4 having a cylindrical circumference and comprising—in this embodiment—two diametrically opposed radial studs 5. The nut is surrounded by a cylindrical guide 6 having axial slots 7 for the studs 5, which slots at their ends remote from the valve each have a tangential enlargement 8 in which the studs 5 are located in the locked position of the nut 5 (see figure 2). The guide 6 furthermore carries a support 39 having a bore 40 for a pivot 41 by means of which a lever 42 is secured to the stop valve. Said lever is provided with a projection 43 cooperating with a stud 5 such that at the end of its lifting stroke (see Fig. 2) the stud 5 is forced into an enlargement 8 of one of the slots 7 whereby the nut—as explained before—is moved into the locked position.

The projection 43 may be replaced by an inclined face. A stop 44 is mounted on the upper end of guide 6.

When the nut 4 is raised by pivoting lever 42 around pivot 41, the nut is held against rotation by the studs 5 which are in the slots 7, and the threads of the nut cause the threaded spindle 1 to rotate, thus opening the valve. The spindle 1 must be prevented from moving axially, because otherwise it will be lifted with the nut 4, and the valve will not move.

The lever 42, for example, may be actuated, pneumatically by means of a lifting cylinder 45 comprising a piston 46, the piston rod 47 being coupled with the lever 42 by means of a pin 48. For this purpose the lever is provided with a slot 49 accommodating the pin.

Further it is possible to so mount a plate 50, on which the mechanism according to the invention bears, on columns 51 resting on the stop valve casing—not shown— to provide for adjustment adapted to take up a decrease in height of the valve and its seat after regrinding thereof. To this end each column 51 has its upper end provided with a long screw threaded portion 52 on which the plate 50 is held by a lower nut 53 and an upper nut 54. By rotating the two nuts the plate may be adjusted to a higher or lower position relative to the columns.

Another embodiment (see Fig. 3) combines the function of one of the columns with that of the lifting cylinder. For that purpose the arrangement of the various parts is such that one of the columns is constructed as a cylinder 55, so that the piston 46 can be accommodated therein. The return spring 56 acting on the piston, the pressure fluid connection 57 and the other parts are the same as in the embodiment according to figures 1 and 2. The nuts 58, 59 hold the plate 50 in its position.

It should be noted that a combination of the mechanism according to the present application with the unlocking mechanism according to my copending patent application Serial No. 640,848 is possible. In such a combination both columns may, inter alia, be constructed as lifting cylinders for operating the unlocking (opening) levers and the locking (closing) levers.

The opening and closing of the stop valve may also be effected by a mechanism comprising a biassed spring which after the melting of a melting plug or pin—e.g. in case of fire—relaxes.

In the embodiment of Figs. 4 and 5 a ring 62 is threaded on the spindle 1 up to the lower side of groove 2. Said ring together with the boss 63 and the piston packing 64 clamped between them form a piston adapted to reciprocate in a cylinder 65. The cylinder 65 is threaded by screw thread 66 to the lower end of the nut guide 6 projecting through the plate 50 and at its free end it is closed by a cover 67 threaded into the cylinder. In said cover an opening 68 is provided to which can be connected a pressure fluid supply conduit for lifting the piston and together there with the stop valve spindle with the nut 4 and the valve member. In Figure 7 said pressure fluid supply conduit is designated by 69.

If for opening the valve the piston is lifted—the supply of pressure fluid may be effected by remote control—the projections 5 will also move upwardly. Now at the upper end of at least one of the axial slots 7 a stationary projection or guide face 70 is provided which will force the studs 5 into the enlargement 8 of the slot. The arrangement is such that the lower side of the stud will remain just below the lower boundary of said enlargement 8, so that when fluid pressure is no longer exerted the projection together with the valve spindle will be slightly lowered under the influence of the closing spring of the valve, until the stud contacts the lower side of the enlargement. The valve therefore is locked in the open position and can be closed again by means of the mechanism disclosed in my copending patent application Serial No. 640,848, likewise by remote control.

Figure 6 shows a stop valve according to a still further embodiment. Said stop valve is arranged in a space that is normally inaccessible and lacks the handwheel 61, while furthermore it is provided with a liquid tight bell-shaped cover 70a in which all parts for the remote control for opening and closing the stop valve are enclosed. Said parts are provided with an appropriate lubricant, so that the stop valve can also be remotely controlled when it is under water.

Said remote control is schematically shown in Figure 7. In addition to the parts already described which are designated by the same reference numerals, the stop valve 71 also comprises the means for closing the valve by remote control as described in my copending patent application Serial No. 640,848. The parts of said means, in so far as necessary, are designated for clearness' sake with the reference numerals used in said copending application.

The main pressure fluid supply conduit 72, for example, receives compressed air from the reserve air reservoir (not shown). The conduit 72 ends at the actuating valve 73 which may be mounted e.g. on a panel together with an actuating lever. The lever can occupy three positions 74a (valve lifting position), 74b (venting position) and 74c (closing position). The valve 73 furthermore comprises vents 75. Conduits 76, 77 conduct the compressed air from the valve 73 to cylinders 65 and 33 respectively, which cylinders comprise pistons which lift the nut with its studs 5 (for opening the valve) or lower said nut with its studs (for closing the valve).

Before the conduits 76 and 77 reach the respective cylinders they may pass pushbutton valves 78, 79, which made it possible to operate the stop valve at its location.

For indicating the position of the stop valve at the place where the actuating valve 73—which is to be used in emergency cases—is located, a valve 80 of a construction known per se is provided, which valve 80 is actuated by flange 25 of ring 23. For that purpose valve 80 is provided with a member 81 and is connected to a pressure fluid supply conduit 82, which conduit also supplies pressure fluid to the cocks 78, 79. In the position shown (valve closed) the valve 80 will allow the pressure fluid to pass via conduit 83 to a repeat cylinder 84 in which a piston 86 carrying an indicator 87 indicating the "valve closed" position 90 is arranged adjacent the valve 73. The valve 86 is loaded by spring 85.

If the stop valve is opened valve 80 is disengaged by the flange 25, so that air escapes and piston 86 with indicator 87 move towards the "valve open" position 91.

The compressed air conduits 72 and 82 are connected by a conduit 88 which ensures that the repeating device will also work in case the source of compressed air (not shown) connected to conduit 82 should fail. A non-return valve 89 should then be provided in conduit 82.

As indicated hereinbefore the positions "valve open" and "valve closed" are designated by numerals 90 and 91 respectively.

It will be clear that as regards details a great many variations are possible without the scope of the invention being departed from.

I claim:

1. For use with a valve having a threaded valve stem fixed against axial movement, the valve being opened and closed by turning the valve stem, apparatus for automatically turning the valve stem to open the valve, comprising a threaded nut engaged with the valve stem, said nut having radially extending means thereon, a guide around said nut in which said nut is slidable and rotatable, said guide being slotted in a direction substantially parallel to the axis of rotation of said nut for receiving said radially extending means, and engaging means engaging said nut and radially extending means and movably mounted on said guide for moving said nut and radially extending means in said guide.

2. For use with a valve having a threaded valve stem fixed against axial movement, the valve being opened and closed by turning of the valve stem, apparatus for automatically turning the valve stem to open the valve, comprising a threaded nut engaged with the valve stem, said nut having two radially extending studs thereon, a cylindrical guide around said nut in which said nut is slidable and rotatable, said guide having two slots therein extending in a direction substantially parallel to the axis of rotation of said nut for receiving said studs, and engaging means engaging said nut and studs and movably mounted on said guide for moving said nut and studs in said guide.

3. Apparatus as claimed in claim 2 in which said slots have a circumferentially extending enlargement therein at one end thereof, whereby said studs may be urged into said enlargements and further movement relative to said guide may be prevented.

4. Apparatus as claimed in claim 2 in which said engaging means comprises a lever pivoted to said guide and engaging one of said studs and means engaging the free end of the lever for pivoting said lever.

5. Apparatus as claimed in claim 2 in which said engaging means comprises a lever pivoted to said guide and engaging one of said studs, said slots having a circumferentially extending enlargement therein at one end thereof, and an inclined surface on said lever engaging one of said studs for urging one of said studs into said enlargements.

6. Apparatus as claimed in claim 2 and stop means on said guide for limiting the movement of said nut along said guide.

7. Apparatus as claimed in claim 2 and a plate on which said guide is mounted, said plate having columns thereon for attachment to a casing for the valve.

8. Apparatus as claimed in claim 2 in which said engaging means comprises a piston member concentric with the valve stem and engaging the end of said nut, and a cylinder member in which said piston member is slidable, said cylinder member being concentric with the valve stem, and means for supplying a pressure medium to said cylinder.

9. Apparatus as claimed in claim 8 in which said slots have a circumferentially extending enlargement therein at the ends thereof opposite said piston member, and a stop on the end of said guide opposite said piston member and having a beveled surface thereon for engaging said studs and urging them into said enlargements.

References Cited in the file of this patent

UNITED STATES PATENTS

| | | |
|---|---|---|
| 1,749,310 | Belcher | Mar. 4, 1930 |
| 1,970,963 | Hose | Aug. 21, 1934 |